United States Patent [19]

Barnes

[11] Patent Number: 4,736,502

[45] Date of Patent: Apr. 12, 1988

[54] TOOL FOR REMOVING THE JACKET FROM ELECTRICAL CABLES

[76] Inventor: Richard P. Barnes, 5806 Montebello Rd., Imperial, Mo. 63052

[21] Appl. No.: 12,183

[22] Filed: Feb. 9, 1987

[51] Int. Cl.⁴ .................. B23P 19/04; H01R 43/00; H02G 1/12
[52] U.S. Cl. .................. 29/33 R; 29/564.4; 81/9.51; 83/924
[58] Field of Search .............. 29/33.52, 33 R, 33.5, 29/564.4, 566.1, 825, 426.5; 81/9.51; 225/99, 3, 103; 83/924

[56] References Cited

U.S. PATENT DOCUMENTS

| | | | |
|---|---|---|---|
| 2,046,341 | 7/1936 | McParlin | 81/9.51 |
| 2,366,271 | 1/1945 | Lerch | 81/9.51 X |
| 2,425,123 | 8/1947 | Quayle et al. | 225/99 X |
| 2,929,286 | 3/1960 | Blakely | 81/9.51 |
| 3,136,045 | 6/1964 | De Rieux et al. | 81/9.51 X |
| 3,175,430 | 3/1965 | Smith et al. | 81/9.51 |
| 3,267,774 | 8/1966 | Bilco et al. | 29/564.4 |
| 4,281,444 | 8/1981 | Smith | 29/426.5 |
| 4,394,828 | 7/1983 | Garbis et al. | 29/566.1 X |
| 4,519,131 | 5/1985 | Starnes et al. | 29/825 |
| 4,682,413 | 7/1987 | Keller | 29/825 |

FOREIGN PATENT DOCUMENTS 3143611  5/1983  Fed. Rep. of Germany ..... 29/33 R

Primary Examiner—William R. Briggs
Attorney, Agent, or Firm—Senniger, Powers, Leavitt and Roedel

[57] ABSTRACT

A tool adapted for removing the outer protective jacket from an electrical cable of the type comprising a plurality of central coaxial conductors surrounded by a layer of insulating material, an inner sheath of conductive material surrounding the insulating material, and a plurality of generally coaxial neutral wires on the outside of the inner sheath and on the inside of the outer protective jacket. The tool comprises a reel rotatable on an axis for rolling engagement with the cable as the reel is rotated on its axis. The reel is configured for tracking on the cable as the reel is rolled along the cable thereby to maintain the reel with its axis generally at right angles to the longitudinal axis of the cable. The reel is adapted for temporarily securing an end of one of the neutral wires to the reel. Handles are provided for rotating the reel on its axis with the one neutral wire secured to the reel thereby to wind the neutral wire on the reel as the reel rolls on the cable, the one neutral wire cutting the outer jacket as it is pulled away from the cable and wound on the reel.

7 Claims, 1 Drawing Sheet

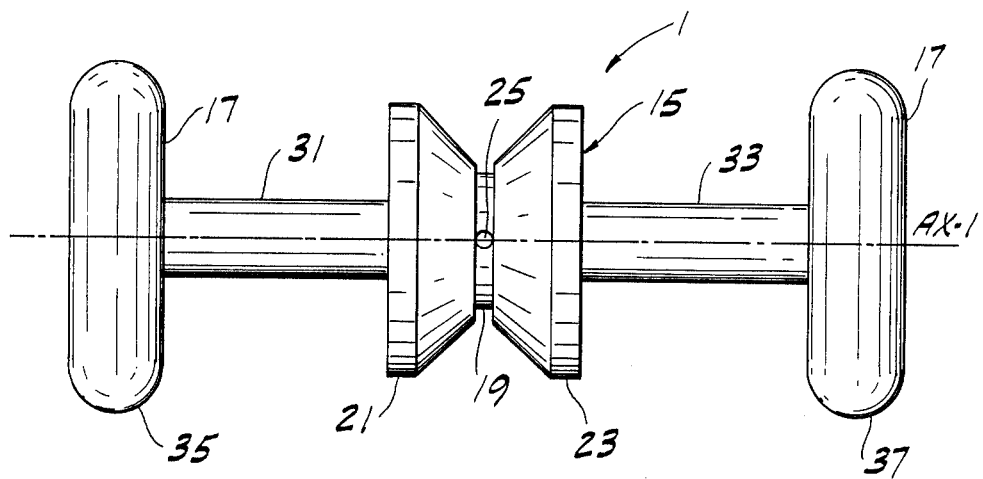
FIG. 2
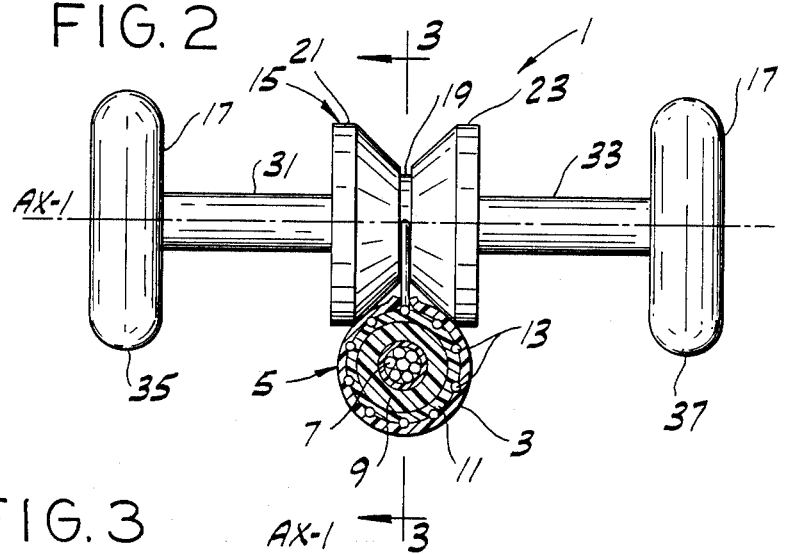
FIG. 3
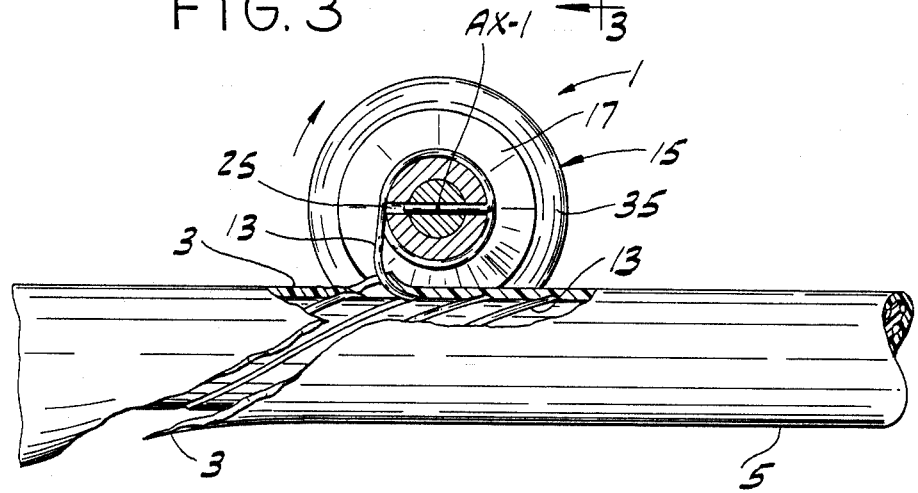

4,736,502

TOOL FOR REMOVING THE JACKET FROM ELECTRICAL CABLES

BACKGROUND OF THE INVENTION

This invention relates generally to electric cable and, more particularly, to a tool for removing the outer protective jacket from electric cable.

Electric cables buried by local power companies transmit energy to homes in subdivisions. Such cables typically include central coaxial conductors surrounded by a layer of insulating material. The insulating material is surrounded by a sheath of conducting material, and several neutral wires are wrapped helically around the outside of the sheath. Within the last few years, such cable has been provided with an outer protective jacket to shield the cable, especially the copper neutral wires, from soil-induced corrosion. As a result, a need has arisen for a tool capable of readily removing a portion of the jacket so that such cable can be spliced together and/or connected to transformers or other pieces of power transmitting equipment. While several such tools have been developed, none have performed satisfactorily. For example, one such tool has an internal bore coaxial with the outer surface of the tool. Different size tools must be used for each size cable (e.g., #2, 40 and 750 size cable). Because the jacket is formed of tough material, such tools have 14-16 inch (360-410 mm) handles extending radially outwardly from the tool so that the tool can be turned on the cable.

To cut the protective jacket, one end of the coaxial cable is inserted in the internal bore of the tool. The tool is then turned on the cable while a sharp blade projecting radially inwardly from an inner wall of the tool cuts the outer jacket helically down the cable. The blade frequently "hangs up" on out-of-round portions of the cable, becoming jammed on the cable. At this point, the jacket must be cut by a knife to free the tool, and then the whole process must be repeated until sufficient jacket has been stripped away for splicing or connecting the cable.

The cable is often located in tight quarters where it is difficult to manipulate tools during installation and repair. For example, there is typically only a 7-8 inch (180-200 mm) space within a transformer where several electrical cables must be spliced and connected to the transformer. As a result, the handles of the aforementioned cylindrical tool are too long for practical use. If the handles are made shorter, however, the tool cannot be turned to cut the jacket. Another problem is the damage to the inner layers and wiring of the cable caused by the tool's blade while stripping away the outer jacket. This problem becomes particularly acute when the cable is substantially out-of-round.

Another tool for removing the outer protective jacket comprises two opposed V-shaped blades interconnected by a collar or framework and 7-8 inch (180-200 mm) handles. One of the blades is fixed at one side of the framework, and the other blade can be adjusted inwardly and outwardly with respect to the fixed blade according to the size cable. To cut the outer jacket, the cable is inserted between the two V-shaped blades, and the adjustable blade is moved inwardly until it is pressed about 1/16 inches (1-2 mm) into the outer jacket. The tool is then turned to cut away the outer jacket. While this tool is adjustable for different size cables, it has the other shortcomings of the cylindrical tool discussed above.

SUMMARY OF THE INVENTION

Among the several objects of the invention may be noted the provision of a tool for readily removing the outer protective jacket from electrical cables; the provision of such a tool which is easy to use in close quarters; the provision of such a tool which does not damage or destroy the wire as it removes the protective jacket; the provision of such a tool which is useful for removing the protective jacket from a wide range of sizes of electrical cables; the provision of such a tool which does not "hang up" on out-of-round cable; the provision of such a tool which is of simple construction; the provision of such a tool which is generally easy to use; and the provision of such a tool which is durable and inexpensive to manufacture.

Generally, a tool of the present invention is adapted for removing the outer protective jacket from an electrical cable of the type comprising a plurality of central coaxial conductors surrounded by a layer of insulating material, an inner sheath of conductive material surrounding the insulating material, and a plurality of generally coaxial neutral wires on the outside of the inner sheath and on the inside of the outer protective jacket. The tool comprises a reel rotatable on an axis for rolling engagement with the cable as the reel is rotated on its axis. The reel is configured for tracking on the cable as the reel is rolled along the cable thereby to maintain the reel with its axis generally at right angles to the longitudinal axis of the cable. Means is provided for temporarily securing an end of one of the neutral wires to the reel. In addition, handle means is provided for rotating the reel on its axis with the one neutral wire secured to the reel thereby to wind the neutral wire on the reel as the reel rolls on the cable, the one neutral wire cutting the outer jacket as it is pulled away from the cable and wound on the reel.

Other objects and features will be in part apparent and in part pointed out hereinafter.

BRIEF DESCRIPTION OF THE DRAWINGS

FIG. 1 is a front elevation of a tool of the present invention;

FIG. 2 is a view similar to FIG. 1 illustrating removal of an outer protective jacket from an electrical cable by the tool of FIG. 1; and FIG. 3 is a cross-section of the tool along line 3—3 of FIG. 2.

Corresponding reference characters indicate corresponding parts throughout the several views of the drawings.

DESCRIPTION OF A PREFERRED EMBODIMENT

Referring now to the drawings, a tool of the present invention is designated in its entirety by the reference numeral 1. The tool 1 is adapted for removing the outer protective jacket 3 from an electrical cable generally indicated at 5 of the type shown in FIGS. 2 and 3. Electrical cable 5 comprises a plurality of central coaxial conductors 7 surrounded by a layer of insulating material 9 (e.g., polyethylene). An inner sheath 11 of conductive material (e.g., black carbon) surrounds the insulating material. A plurality of generally coaxial neutral wires 13 are wrapped helically around the outside of the inner sheath and on the inside of the outer protective jacket 3. The neutral wires 13 serve to bleed off static electricity (electrolysis). Such cable is typically buried underground for use by local power companies in transmitting high voltage electricity.

As shown in FIG. 1, the tool 1 comprises a reel generally indicated at 15 rotatable on an axis AX-1 extending in side-to-side direction with respect to the reel and two handles 17 at opposite sides of the reel.

More specifically, the reel 15 has a central body portion 19 and opposite circular side portions 21 and 23. The body portion 19 of the reel is tapered inwardly from the side portions 21 and 23 toward the center of the reel to form a V-shaped channel configuration for retaining wire 13 wound on the reel generally at the center of the body portion of the reel. As shown in FIG. 2, the side portions 21 and 23 are adapted for rolling engagement with the cable 5 to track on the cable as the reel is rotated on its axis AX-1, thereby to maintain the reel with its axis generally at right angles to the longitudinal axis of the cable. It will be observed that the side portions 21 and 23 will track on a number of different size cables.

Means is provided for temporarily securing an end of one of the neutral wires 13 to the reel 15. For example, the body 19 of the reel 15 may have an opening 25 radially through the body. It will be observed that, due to the opening 25 and channel configuration of the reel 15, wire is retained on the reel as it is rotated to wind the wire thereon.

The handles 17 are provided for rotating the reel. As shown, they are secured to the outer ends of shafts 31 and 33 extending laterally outwardly from opposite side portions 21 and 23, respectively, of the reel. The handles 17 are circular in shape and have gripping means thereon for facilitating gripping of the handles (e.g., rubber grips 35 and 37 wrapped around the handles). The handles 17, 17 are preferably positioned about two inches (51 mm) from the side portions 21 and 23 of the reel 15 so that there is sufficient space to grasp the handles securely.

To remove the outer protective jacket 3 of the coaxial cable 5, a small portion of the protective jacket is cut away to expose an end of one neutral wire 13 for connection to the tool 1. The end of this neutral wire 13 is then inserted in the opening 25 through the reel body 19. While the wire may be inserted entirely through the opening 25, it is only necessary that sufficient wire be inserted for the body to securely hold the wire. The handles 17 are then grasped in the workman's hands and rotated (e.g., clockwise in FIG. 3) on the axis AX-1 of the reel along the coaxial cable 5 to wind the neutral wire 13 on the body portion 19 as the reel rolls on the cable. It will be observed that the neutral wire 13 cuts the outer jacket 3 as it is pulled away from the cable 5 and wound on the body portion 19 of the reel. It will also be observed that tool 1 does not damage the inner layers (e.g., insulating layer 9, inner sheath 11, etc.) of the coaxial cable as it removes the protective jacket 3.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A tool adapted for removing the outer protective jacket from an electrical cable of the type comprising a plurality of central coaxial conductors surrounded by a layer of insulating material, an inner sheath of conductive material surrounding said insulating material, and a plurality of generally coaxial neutral wires on the outside of the inner sheath and on the inside of the outer protective jacket, said tool comprising a reel rotatable on an axis for rolling engagement with the cable as the reel is rotated on its axis, said reel being configured for tracking on said cable as the reel is rolled along the cable thereby to maintain the reel with its axis generally at right angles to the longitudinal axis of the cable, means for temporarily securing an end of one of the neutral wires to the reel, and handle means for rotating the reel on its axis with said one neutral wire secured to the reel thereby to wind the neutral wire on the reel as the reel rolls on the cable, said one neutral wire cutting the outer jacket as it is pulled away from the cable and wound on the reel.

2. A tool as set forth in claim 1 wherein said reel has a central body portion and opposite side portions, said axis extending in side-to-side direction with respect to the reel.

3. A tool as set forth in claim 2 wherein said reel is formed for retaining wire on the body portion of the reel as the reel is rotated to wind the wire on the reel.

4. A tool as set forth in claim 1 wherein said securing means comprises an opening in the body portion of the reel.

5. A tool as set forth in claim 1 wherein said body portion of the reel is tapered inwardly from said opposite side portions of the reel toward the center of the reel thereby to form a channel configuration for retaining wire wound on the reel generally at the center of the body portion of the reel.

6. A tool as set forth in claim 1 wherein said handle means comprises a pair of shafts extending laterally outwardly from opposite side portions of the reel on the axis of the reel, and handles at the outer ends of the shafts for turning the shafts thereby to rotate the reel.

7. A tool as set forth in claim 6 wherein said handles are circular in shape and have gripping means thereon for facilitating gripping of the handles.

* * * * *